No. 710,967. Patented Oct. 14, 1902.
H. GREEN.
HAY RETARDING DEVICE.
(Application filed Feb. 27, 1902.)
(No Model.)
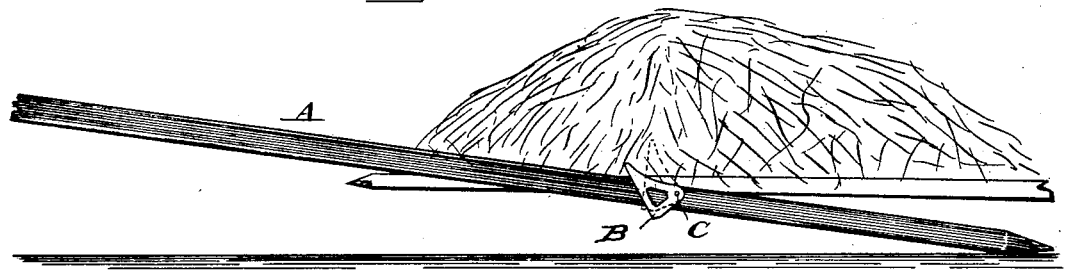
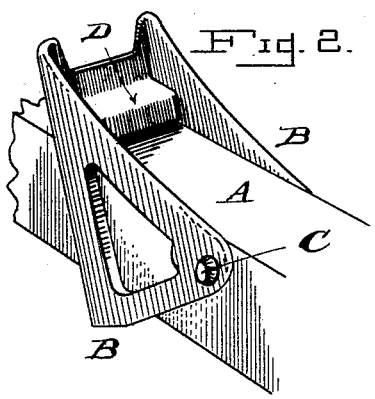
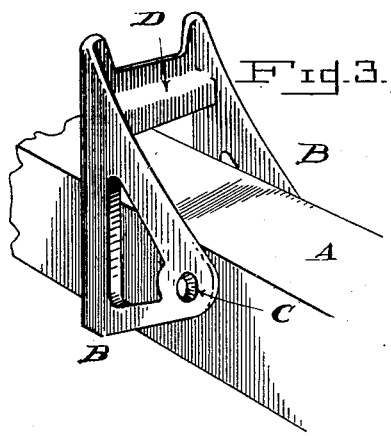
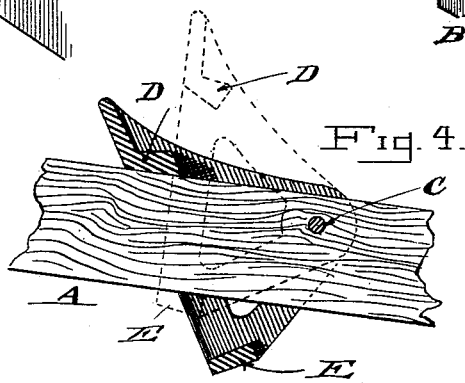
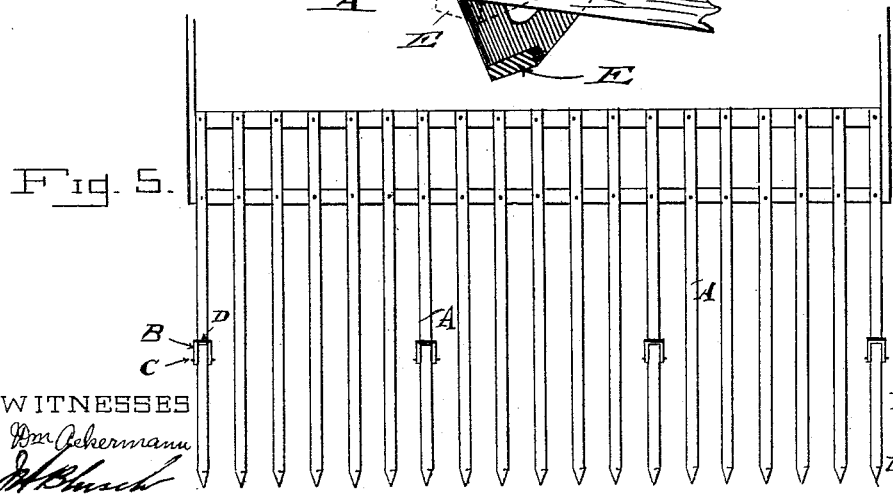
WITNESSES
INVENTOR
Henry Green
By L. N. Thurlow
ATT'Y.

UNITED STATES PATENT OFFICE.

HENRY GREEN, OF PEKIN, ILLINOIS, ASSIGNOR TO THE ACME HARVESTER COMPANY, OF PEORIA, ILLINOIS, A CORPORATION OF ILLINOIS.

HAY-RETARDING DEVICE.

SPECIFICATION forming part of Letters Patent No. 710,967, dated October 14, 1902.

Application filed February 27, 1902. Serial No. 96,012. (No model.)

*To all whom it may concern:*

Be it known that I, HENRY GREEN, a citizen of the United States, residing at Pekin, in the county of Tazewell and State of Illinois, have invented certain new and useful Improvements in Hay-Retarding Devices; and I do hereby declare that the following is a full, clear, and exact description of the invention, which will enable others skilled in the art to which it appertains to make and use the same.

This invention pertains to a hay-retarding device for use on haying-tools, and relates more particularly to a device for attachment to the lifting-teeth of hay-stackers.

An object of the invention is to prevent hay which has been loaded upon the teeth of a stacker from slipping or being pulled from its proper position.

A further object is to provide a device for use on the lifting-teeth of a stacker which will allow the hay to be easily deposited on such teeth, but prevent it moving after being deposited thereon by the hay-rake.

Another object is to arrange an automatic device for the above purpose which will pivot in such manner as to permit the hay to be pushed upon the stacker-teeth, but will rise by pressure of the hay against it and prevent a retrograde movement thereof toward the points of the teeth when the hay-rake delivering the load is withdrawn.

In the drawings herewith presented and which form a part of this application, Figure 1 is a side view of the lifting-teeth of a hay-stacker, showing the loaded teeth of a field-rake in the act of delivering a load of hay upon the former. Fig. 2 is a perspective view of a portion of a stacker-tooth, showing my device mounted thereon in its lowest position. Fig. 3 is also a perspective view of the tooth, showing the device in its raised position. Fig. 4 is a side view of a stacker-tooth, showing my device in section and in two positions. Fig. 5 is a plan view of the lifting-head of a stacker, showing four of the retarding devices mounted thereon. Fig. 6 is a modified form of the device, showing the tooth in longitudinal section.

A represents a tooth of the stacker-head, upon which my retarding device is mounted, and which consists of a casting having a wing B at each side of the tooth. Said wings are of a triangular form, one corner of each being pivoted to the tooth by means of a pin C, which passes entirely through the tooth, each end passing through one of the said wings. At each of the outer extremities of the triangle is a cross-web D and E, at the top and bottom, respectively, as shown in Fig. 4. In said figure the retarder is shown in two positions and is free to rise and fall on its pivot for the purposes to be hereinafter described. When placing the retarder upon the tooth, the said tooth is pushed through the former between the webs D and E. The latter are preferably beveled on their surfaces where they strike against the tooth, so that a flat surface is presented for contact. While I prefer this construction, I do not intend to limit myself to it, as may be understood. In practice I make the portion of the retarder above the tooth project as little as possible when in its lowest position, as shown in Figs. 2 and 4, so that the hay may easily slip over it when being placed upon the teeth from the field-rake. The said retarder is pivoted high upon the tooth, so that when it is raised to the position shown in Fig. 3 and in Fig. 4 in broken lines it will stand quite high in order to present a larger surface to the hay to prevent movement thereof.

I state above that the device consists of a casting; but it may also be formed by a sheet-metal punching, which will be as efficient as the casting, or said device may be formed in any other good manner known to those skilled in the production of such arrangements. I do not confine myself to the particulars shown and described, and the device may be altered in a number of ways without departing from the spirit of my invention.

As stated in the objects above, I seek to provide a device for permitting the hay to be put upon the stacker-teeth and then prevent the slipping of the hay thereon, and I do not wish to limit the same to any specified structure, since any form or shape thereof will accomplish the desired aim. As an instance of the manner in which I may modify the device, I show in Fig. 6 a flat piece F in the form of an L, whose shortest extremity is let into a slot G in the tooth and there pivoted.

The slot is of peculiar form, having a shoulder at H, with which said short portion contacts, and a face I supports the long arm, as shown. The use and operation of the form thus constructed is obvious from what has gone before.

The operation may now be understood. As shown in Fig. 1, the field-rake brings a load of hay to the stacker and pushes it upon the teeth of the latter and upon the retarders, which normally occupy the position shown in full lines in that figure. After the hay has been placed the field-rake is backed away, and the hay naturally tends to follow it by the friction between the hay and the teeth; but at this time the retarders come into use. The hay must, of course, in taking a backward movement bear against the said retarders, and since the point of contact between the hay and the retarders is above the pivotal point of the latter said retarders rise to the highest position. (Shown in Figs. 1, 3, and 4.) By placing one of these devices upon every fifth, sixth, or seventh tooth, as shown in Fig. 5, the hay is easily held and all trouble caused by the sliding of the hay is averted. The retarders retain their raised position until the hay is ready for delivery upon the stack, at which time they fall by gravity to the lower or normal position; but if for any reason they should not reach the latter position the next load of hay will push them down as it comes upon the stacker, as will be readily understood.

In so far as I am aware no device of this kind has yet been used for the purposes described.

Therefore I wish to claim as my own—

1. A hay-retarding device for use on haying-tools consisting of a member supported on a stacker-tooth and adapted to rise and fall and adapted to permit the hay to pass over it in one direction as when loading but preventing movement of the hay in the other direction for the purposes described.

2. A hay-retarding device for use on haying-tools which consists of a member pivotally supported on a stacker-tooth and adapted to rise and fall on its pivot whereby when in its lowest position hay may be pushed thereover and when raised the hay is prevented from moving toward the points of the teeth for the purposes explained.

3. A hay-retarding device for use on haystackers comprising a member pivoted to a lifting-tooth of the stacker, the same adapted to automatically rise and fall on its pivot by the weight of the hay and the force of gravity respectively for the purposes explained.

4. A hay-retarding device consisting of the side wings for straddling a tooth and pivoted thereto, a stop at the top and bottom of the said device for limiting the up-and-down movement thereof and arranged whereby the device is raised by backward pressure of hay against it for preventing the hay slipping off the ends of the teeth and whereby also, the said device will fall by gravity after delivery of hay to permit loading.

5. A hay-retarding device consisting of the side wings B B, one at each side of the tooth, the web D and E at the top and bottom respectively for connecting said wings and forming stops for limiting the vertical movement of the device, and the pivot-pin C for pivoting the wings to a stacker-tooth to permit said vertical movements, in combination with a tooth substantially as described and shown and for the purposes set forth.

6. A new article of manufacture comprising two parallel triangular sides B B, there being a hole in one corner of each, said holes being opposite one another, and a connecting-web between the said triangular sides at the corners remote from said holes as set forth.

7. In combination with the tooth of a haystacker, a device pivoted thereto to move in a vertical plane on its pivot, such device comprising a body portion pivoted so as to normally lie at a lowest position by its own weight, there being a stop on said device to limit its vertical movements.

In testimony whereof I affix my signature in presence of two witnesses.

HENRY GREEN.

Witnesses:
A. C. BLACK,
W. C. BARTLETT.